3,560,596
O-ALKYL S-PHENYL BENZYLPHOS-
PHONOTHIOLATES
Seiichi Hirane, Masahiro Aya, and Shigeo Kishino, Tokyo,
  Japan, assignors to Nihon Tokushu Noyaku Seizo Kabu-
  shiki Kaisha, Tokyo, Japan, a corporation of Japan, and
  Farbenfabriken Bayer Aktiengesellschaft, Leverkusen-
  Bayerwerke, Germany, a corporation of Germany
No Drawing. Filed Jan. 22, 1968, Ser. No. 699,296
  Claims priority, application Japan, Jan. 28, 1967,
     42/5,710; Apr. 17, 1967, 42/24,342
     Int. Cl. A01n 9/36; C07f 9/40, 9/42
U.S. Cl. 260—951                              24 Claims

ABSTRACT OF THE DISCLOSURE

Agricultural and horticultural fungicides, especially useful for the control of microorganisms which breed diseases of rice, comprising organic phosphothiolates not containing heavy metals harmful to men and cattle, and the ingredients represented by the following Formula I

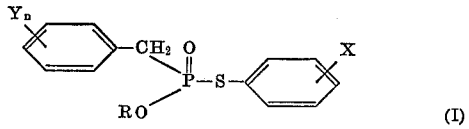

(I)

wherein R stands for a member selected from the group consisting of alkyl groups having 1–4 carbon atoms, X stands for a member selected from the group consisting of hydrogen atom, chlorine atom and methyl group, Y stands for a member selected from the group consisting of hydrogen atom, chlorine atom, alkyl groups having 1–4 carbon atoms and alkoxy groups and $n$ is a number selected from the group consisting of zero, 1 and 2.

---

The present invention relates to agricultural and horticultural fungicides comprising organic phosphothiolates not containing heavy metals harmful to men and cattle.

More particularly, the present invention relates to agricultural and horticultural fungicides comprising a compound selected from the group consisting of O-alkyl S-phenyl benzyl phosphonothiolates represented by the following Formula I

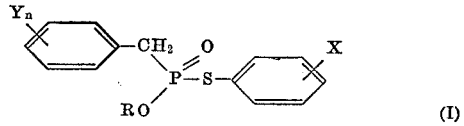

(I)

wherein R stands for a member selected from the group consisting of alkyl groups having 1–4 carbon atoms, X stands for a member selected from the group consisting of hydrogen atom, chlorine atom and methyl group, Y stands for a member selected from the group consisting of hydrogen atom, chlorine atom, and alkyl and alkoxy groups having 1–4 carbon atoms and $n$ is a number selected from the group consisting of zero, 1 and 2.

For the control of blast (*Piricularia oryzae*) and sheath blight (*Hypochnus sasakii*), important diseases of rice from the past, such compounds as phenyl mercuric acetate and methyl arsonic acid metal salts, etc. have been applied extensively due to their superior fungicidal efficacy and economical reason.

Of late, however, the application of organic mercury compounds to rice plant in its growing stage has been brought to light in view of giving bad influence to public health by their direct toxicity and indirect residual toxicity to the human body. Therefore, the development of agricultural chemicals not containing these heavy metals harmful to men and cattle and effective against the aforementioned rice diseases and cheap-priced has been earnestly desired.

We, the inventors, after testing biological activity of various organic phosphorus compounds in order to solve the aforementioned problem, have discovered that novel O-alkyl S-phenyl benzylphonothiolates shown by the aforementioned general Formula I were useful as agricultural and horticultural fungicide, and especially they had excellent efficacy against important rice diseases such as blast (*Piricularia oryzae*), Brown spot (*Cochliobolus miyabeanus*) and sheath blight (*Hypochnus sasakii*) and thus we have completed this invention.

The following Table I shows the compounds exemplified to be used in this invention.

TABLE I

| Compound | Structural formula | Chemical name |
|---|---|---|
| No. 1 | [structure with CH₃O and phenyl groups] | O-methyl S-phenyl benzylphosphonothiolate. |
| No. 2 | [structure with CH₃O and 4-methylphenyl groups] | O-methyl S-(4-methylphenyl) benzylphosphonothiolate. |
| No. 3 | [structure with C₂H₅O and phenyl groups] | O-ethyl S-phenyl benzylphosphonothiolate. |
| No. 4 | [structure with C₂H₅O and 4-methylphenyl groups] | O-ethyl S-(4-methylphenyl) benzylphosphonothiolate. |
| No. 5 | [structure with (CH₃)₂CHO and phenyl groups] | O-iso-propyl S-phenyl benzylphosphonothiolate. |

TABLE I—Continued

| Compound | Structural formula | Chemical name |
|---|---|---|
| No. 6 | Cl—C₆H₄—CH₂—P(=O)(OCH₃)—S—C₆H₅ | O-methyl S-phenyl 4'-chlorobenzylphosphonothiolate. |
| No. 7 | Cl—C₆H₄—CH₂—P(=O)(OCH₃)—S—C₆H₄—CH₃ | O-methyl S-(4-methylphenyl) 4'-chlorobenzylphosphonothiolate. |
| No. 8 | Cl—C₆H₄—CH₂—P(=O)(OC₂H₅)—S—C₆H₅ | O-ethyl S-phenyl 4'-chlorobenzylphosphonothiolate. |
| No. 9 | Cl—C₆H₃(Cl)—CH₂—P(=O)(OCH₃)—S—C₆H₄—CH₃ | O-methyl S-(methylphenyl) 2',4'-dichlorobenzylphosphonothiolate. |
| No. 10 | Cl—C₆H₃(Cl)—CH₂—P(=O)(OC₂H₅)—S—C₆H₅ | O-ethyl S-phenyl 2',4'-dichlorobenzylphosphonothiolate. |
| No. 11 | C₆H₅—CH₂—P(=O)(OCH₃)—S—C₆H₄—Cl | O-methyl S-(4-chlorophenyl) benzylphosphonothiolate. |
| No. 12 | C₆H₅—CH₂—P(=O)(OC₂H₅)—S—C₆H₄—Cl | O-ethyl S-(4-chlorophenyl) benzylphosphonothialote. |
| No. 13 | Cl—C₆H₄—CH₂—P(=O)(OCH₃)—S—C₆H₄—Cl | O-methyl S-(4-chlorophenyl) 4'-chlorobenzylphosphonothiolate. |
| No. 14 | Cl—C₆H₄—CH₂—P(=O)(OC₂H₅)—S—C₆H₄—Cl | O-ethyl S-(4-chlorophenyl) 4'-chlorobenzylphosphonothiolate. |
| No. 15 | Cl—C₆H₃(Cl)—CH₂—P(=O)(OCH₃)—S—C₆H₄—Cl | O-methyl S-(4-chlorophenyl) 2',4'-dichlorobenzylphosphonothiolate. |
| No. 16 | Cl—C₆H₃(Cl)—CH₂—P(=O)(OCH₃)—S—C₆H₄—Cl | O-methyl S-(4-chlorophenyl) 3',4'-dichlorobenzylphosphonothiolate. |
| No. 17 | CH₃—C₆H₄—CH₂—P(=O)(OCH₃)—S—C₆H₅ | O-methyl S-phenyl 4'-methylbenzylphosphonothiolate. |
| No. 18 | CH₃—C₆H₄—CH₂—P(=O)(OCH₃)—S—C₆H₄—Cl | O-methyl S-(4-chlorophenyl) 4'-methylbenzylphosphonothiolate. |
| No. 19 | CH₃—C₆H₄—CH₂—P(=O)(OCH₃)—S—C₆H₄—CH₃ | O-methyl S-(4-methylphenyl) 4'-methylbenzylphosphonothiolate. |

TABLE I—Continued

| Structural formula | Chemical name |
|---|---|
| Compound: | |
| No. 20 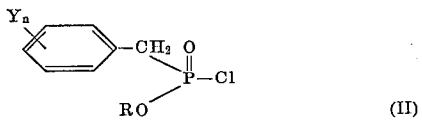 | O-ethyl S-phenyl 4'-methylbenzylphosphonothiolate. |
| No. 21 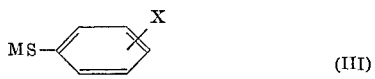 | O-methyl S-phenyl 4'-ethylbenzylphosphonothiolate. |
| No. 22 | O-methyl S-phenyl 4'-methoxybenzylphosphonothiolate. |

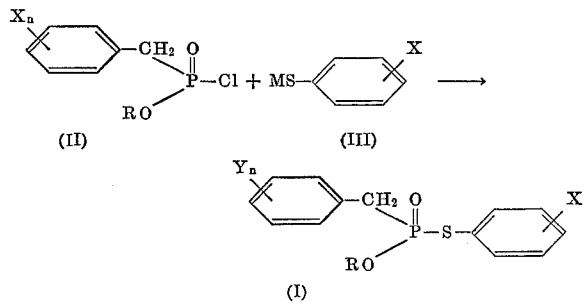

The aforementioned such compounds may be easily produced by reacting benzylphosphonic acid alkyl ester chloride represented by the following Formula II $$\begin{array}{c} Y_n \\ \diagdown \\ \diagup \\ \end{array} - CH_2 \begin{array}{c} O \\ \| \\ P-Cl \\ \diagup \\ RO \end{array} \quad (II)$$

(wherein R, Y and $n$ stand for the same as defined the Formula I) with a compound represented by the following Formula III $$MS-\diagup\diagdown-X \quad (III)$$

wherein X stands for the same as defined the Formula I, and M stands for a member selected from the group consisting of hydrogen atom and alkali metal atoms) in accordance with the following reaction scheme.

$$\begin{array}{c} X_n \\ \diagdown \\ \diagup \end{array}-CH_2\begin{array}{c}O\\\|\\P-Cl\\\diagup\\RO\end{array} + MS-\diagup\diagdown-X \longrightarrow$$

(II)   (III)

$$\begin{array}{c} Y_n \\ \diagdown \\ \diagup \end{array}-CH_2\begin{array}{c}O\\\|\\P-S-\diagup\diagdown-X\\\diagup\\RO\end{array}$$

(I)

The reaction shown by said reaction scheme suffices to react a compound of said Formula II with a compound of said Formula III in the optional presence of an organic solvent, however, it is preferable to carry out the reaction with heating.

The said reaction may employ a usually utilized acid-binding agent such as an organic base, for instance, triethylamine, benzyldimethylamine, pyridine and 2-methyl-5-ethyl pyridine or an inorganic base, for instance, sodium carbonate, potassium carbonate, sodium bicarbonate and potassium bicarbonate. As a compound of said Formula III, when substituted or unsubstituted thiophenol wherein M is hydrogen atom is used, utilization of an acid binding-agent is recommended.

As the reaction temperature, normally a temperature within the range of 0° C. to 80° C. may be adopted, however, it is possible to carry out the reaction at a temperature higher or lower than said range if desired.

When as the reaction medium organic solvent is utilized, such solvents, for instance, liquid hydrocarbons (benzene, xylene, hexane etc.), liquid chlorinated hydrocarbons, ethers and ketones may be utilized.

The reaction time is properly changed depending upon the reaction temperature, reaction components and other reaction conditions, however, usually periods of time from about one hour to 10 hours.

Further, as occasion demands it is possible to carry out the reaction in nitrogen gas stream.

After completion of the reaction, the product may be obtained by filtering the produced salts, further washing the filtrate with water or an aqueous solution of carbonic acid and drying with sulfuric soda anhydride and then removing the solvent, thereafter purifying the product as occasion demands.

Most of the compounds of said Formula I obtained by said process are oily substances generally insoluble in water, but soluble in organic solvents, for instance, alcohols, benzene, xylene, hexane, ethers, ketones, chlorinated hydrocarbons and hydrocarbons.

When they are used, it may be utilized by various methods known in the agricultural and horticultural fields.

Namely, when the compounds of this invention are used as agricultural and horticultural fungicides, they are used diluted with water directly or in admixture with carriers and formulated into wettable powders, emulsifiable concentrates, dusts, granules or pastes by the method generally used in ordinary agricultural chemical industry. As solid carriers are exemplified inactive materials such as talc, clay, kaolin, montmorillonite, diatomaceous earth, calcium carbonate, etc. As liquid carriers either solvents or even non-solvents which can disperse or dissolve the active ingredients by adjuvant can be used, e.g., alcohol, benzene, xylene, dimethyl naphthalene, aromatic naphtha, dimethyl formamide, surface active agent, etc.

They can be applied, for assuring their efficiency, in admixture with such adjuvants used for agricultural chemical industry, in general as spreader, emulsifier, wetting agent, adhesive agent, etc. Further, they can be applied in admixture with such insecticides, acaricides and nematocides as organo-phosphorus compounds, carbamate compounds, chlorinated compounds, dinitro-compounds, such fungicides as organophosphorus compounds, organic sulfur, copper compounds, dithiocarbamate compounds, dinitro-compounds, antibiotics, such herbicides as substituted phenoxy compounds, carbamate compounds, urea compounds, triazine compounds, chlorophenols, substituted diphenyl ethers, anilide compounds and other agricultural chemicals and fertilizers.

In using the fungicides of the invention, in case of powder material, it can be directly dusted with a duster on the leaves or stems of plants or treated on the seed, and in case of emulsifiable concentrates, it cas be diluted with water etc. to a desirable concentration and may be applied on leaves and stems of plants by spraying it with a sprayer and in case of wettable powders they can be applied by spraying it with a sprayer as a suspension of a desirable concentration with water etc. and in case of granular they can be sprinkled upon soil as such or with a sprayer.

The fungicides of this invention are ordinarily used at a ratio of 25 g.–100 g., preferably 40 g.–100 g., especially 60 g.–80 g. of the active ingredients per 10 ares, however, if desired they may be used in smaller or larger amounts. The used amounts are properly variable depending upon kind of the active ingredients, applying method, applying period, object of application or formulation of fungicides.

As aforementioned in contrast to the conventional fungicides heretofore applied for controlling the most important diseases of rice plant which have serious deficiency in that they give bad influence by direct and indirect toxicity to men and cattle due to containing heavy metals such as mercury and arsenic, the fungicides of this invention completely overcome such deficiency due to harmful heavy metals, moreover, they have excellent fungicidal effects to rice diseases, above all, blast, brown spot and sheath spot.

One of the characteristics of the fungicides (phosphonothiolates) used in the present invention is that they have excellent fungicidal activity against *Piricularia oxyzae, Cochliobolus miyabeanus* and *Hypochnus sasakii*, when compared with the compounds (phosphates) in which the sulphur atom interposing between the phosphorus atom and the group

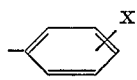

in Formula I is replaced by an oxygen atom. Testing examples of fungicidal effect with respect to such compounds are hereinafter described as comparative examples.

The following examples illustrate the process for the preparation of the fungicides of our invention, but supplements and specific compounds of the examples are alterable and will not restrict our invention.

(I) PROCESS FOR THE PRODUCTION OF FUNGICIDES

Example 1

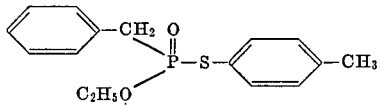

14.6 g. of benzylphosphonic acid ethyl ester chloride, 7.5 g. of 4-methylthiophenol are dissolved in 150 ml. of benzene. 6 g. of triethylamine is added dropwise under cooling condition and further, the mixture is stirred for three hours at 60° C. After cooling, benzene solution is washed with cold water and dried over sodium sulfate anhydride. Distilling off benzene, 14.9 g. of undistillable pale yellow oily O-ethyl S-(4-methylphenyl) benzylphosphonothiolate is obtained at 150° C./0.1 mm. Hg.

Manufacturing method of starting materials

Benzylphosphonic acid alkyl ester chlorides, the starting materials, are manufactured according to the following reaction scheme below.

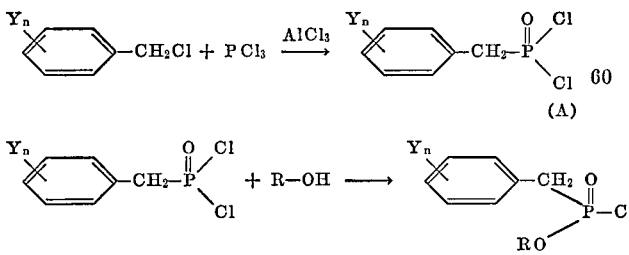

(R, Y and n are the same as the forementioned general Formula II.)

Reference example

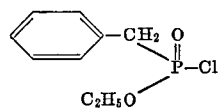

(A) 133.5 g. of aluminum trichloride is suspended into 303 g. of phosphorus trichloride and 63.3 g. of benzylchloride is added gradually while stirring and uniform reaction mixture is obtained. Distilling off surplus phosphorus trichloride under reduced pressure, the mixture is dissolved in 4–6 times of dichloromethane and water is added gradually at −20° C. to −15° C. until crystal of aluminum chloride hydrate is separated clearly. After aluminum trichloride hydrate is removed by filtration and dichloromethane is distilled off, 66 g. of benzylphosphonyl dichloride is obtained at 107°–8° C./0.4 mm. Hg.

(B) 26 g. of obtained benzylphosphonyldichloride is dissolved in 100 ml. of ether and cooled to 0° C. 6 g. of ethanol and 13 g. of triethylamine is dissolved in 100 ml. of ether and the mixed ether solution is added dropwise to the cooled ether solution while stirring below 0° C. After the completion of addition, stirring is further continued at 0° C. for two hours and produced precipitation is removed by filtration. The filtrate is concentrated by distillation and the residue is distilled and 17.6 g. of benzylphosphonic acid ethyl ester chloride is obtained at 98° C./0.1 mm. Hg.

Example 2

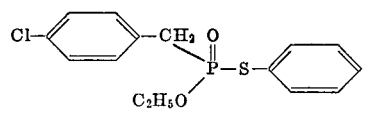

17.0 g. of 4-chlorobenzyl phosphonic acid ethyl ester chloride and 6.6 g. of thiophenol are dissolved in 150 ml. of benzene. 6 g. of triethylamine is added dropwise under cooling condition and further stirred for 10 hours at room temperature. Next, benzene solution is washed with cold water and dried over sodium sulfate anhydride. Distilling off benzene, 15.1 g. of undistillable pale yellow oily O-ethyl S-phenyl 4′-chlorobenzylphosphonothiolate is obtained at 140° C./0.1 mm. Hg.

Example 3

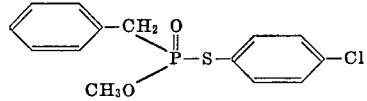

In 150 ml. of benzene, 13.6 g. of benzylphosphonic acid methyl ester chloride and 8.7 g. of 4-chlorothiophenol are dissolved. While cooling, 6 g. of triethylamine is added dropwise and the mixture is further stirred for 2 hours at 70° C. After cooling, benzene solution is washed with cold water and dried over sodium sulfate anhydride. Distilling off benzene, 14.4 g. of undistillable pale yellow oily O-methyl S-(4-chlorophenyl) benzylphosphonothiolate is obtained t 140° C./0.1 mm. Hg.

Example 4

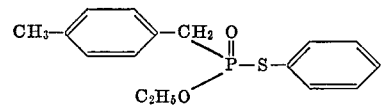

In 160 ml. of benzene, 15.5 g. of 4-methylbenzylphosphonic acid ethyl ester chlorider and 6.6 g. of thiophenol and dissolved. And 6.0 g. of triethylamine is added dropwise under cooling condition and the mixture is further stirred for 10 hours at room temperature. Then benzene solution is washed with cold water and dried over sodium anhydride. Distilling off benzene, 14.0 g. of undistillable pale yellow oily O-ethyl S-phenyl 4'-methylbenzylphosphonothiolate is obtained at 150° C./0.1 mm. Hg.

The following examples illustrate the preparation of fungicides and also the method of using the same will be explained in the following testing examples:

It should be noted that the additives and active ingredients may be changed over a wide range.

(II) PREPARATION OF FUNGICIDES (COMPOSITIONS)

Example 1

40 part of O-methyl S-(4-methylphenyl) benzylphosphonothiolate, 58 parts of clay and 2 parts of emulsifier Sorpol W-150 are formulated into wettable powder by crushing and mixing, and applied diluted with water.

Example 2

50 parts of O-ethyl S-phenyl benzylphosphonothiolate, 30 parts of xylene and 20 parts of emulsifier Sorpol 2020 are formulated into emulsifiable concentrates by mixing and stirring and applied diluted with water.

Example 3

2 parts of O-methyl S-phenyl benzylphosphonothiolate, 98 parts of mixture of talc and clay are formulated into dust by crushing and mixing, and applied as it is.

Example 4

5 parts of O-ethyl S-phenyl 4'-chlorobenzylphosphonothiolate dissolved in solvent was sprayed onto 95 parts of mulmerized clay granules of 0.2-2 mm. in diameter in mixer (V-shaped) while rotating, and thus granules are obtained after drying. They are applied as they are.

Example 5

30 parts of O-methyl S-(4-chlorophenyl) benzylphosphono thiolate, 68 parts of clay and 2 parts of emulsifier Sorpol W-150 are formulated into wettable powder by crushing and mixing and applied diluted with water.

Example 6

50 parts of O-methyl S-phenyl 4'-methylbenzylphosphonothiolate, 30 parts of xylene and 20 parts of emulsifier Sorpol 2020 are formulated into emulsifiable concentrates by mixing and stirring and applied diluted with water.

Example 7

2 parts of O-methyl S-(4-chlorophenyl) 4'-chlorobenzylphosphonothiolate and 98 parts of mixture of talc and clay are formulated into dust by crushing and mixing, and applied as it is.

Example 8

5 parts of O-methyl S-(4-chlorophenyl) benzylphosphonothiolate dissolved in solvent was sprayed onto 95 parts of mulmerized clay granules of about 0.2-2 mm. in diameter in mixer (V-shaped) while rotating and granules are obtained after drying. They are applied to soil as they are.

(III) APPLYING EXAMPLES

Some experimental results of fungicidal effect of the compounds of present invention are shown below in the following Tables II, III.

Testing examples (i) Tests against blast (pot test): Paddy rice (Jukkoku variety) was cultivated in pots 12 cm. in diameter and the suspensions of test chemicals were sprayed on the rice plants at their young ear forming period. From the next day the treated rice plants were kept in a green house under the conditions of high humidity at the temperature of 25° C. for 48 hours. During that time the suspension of spores of rice blast pathogen was sprayed for inoculation two times. After the inoculated rice plants were kept in the green house for 7 days, the disease attack rate per pot were classified in the degrees from 0 (no attack) to 5 (heavy attack) and valued.

The controlling values of the test chemicals were calculated out by the index numbers obtained from the disease attack rates to rice plant in the treated plots against those in the control plots.

(ii) Test againt plant pathogen (agar dilution method): The test chemicals were mixed in the agar culture medium of potato making the concentration as prescribed. After the medium was poured into scale 9 cm. in diameter and made coagulated, plant pathogens were inoculated. After having been cultured at 27° for 4 days, the growth condition of plant pathogens was investigated and the minimum concentration of growth inhibition was sought.

In Table II there are shown as comparison carried out in the same manner as above by using compounds having the same structures as those of active ingredients Nos. 12 and 13 of the present invention except that an oxygen atom interposes between the phosphorus atom and the group

TABLE II.—THE EXPERIMENTAL RESULTS OF FUNGICIDAL EFFECT AGAINST BLAST (POT TEST)

| Compound [1] | Concentration as a.i., p.p.m. | Rate of attack [2] | Phytotoxicity |
|---|---|---|---|
| No. 1 | 500 | 1.2 | |
| No. 2 | 500 | 1.4 | |
| No. 3 | 500 | 1.2 | |
| O-ethyl O-(4-chlorophenyl) benzylphosphonate (comparison) | 500 | 3.0 | |
| No. 4 | 500 | 1.2 | |
| No. 5 | 500 | 1.6 | |
| No. 6 | 500 | 2.6 | |
| No. 7 | 500 | 2.2 | |
| No. 8 | 500 | 1.6 | |
| No. 9 | 500 | 2.0 | |
| No. 10 | 500 | 1.8 | |
| No. 11 | 500 | 0.9 | |
| No. 12 | 500 | 1.6 | |
| O-ethyl O-phenyl benzylphosphonate (comparison) | 500 | 4.0 | |
| No. 13 | 500 | 2.5 | |
| No. 14 | 500 | 2.3 | |
| No. 15 | 500 | 2.8 | |
| No. 16 | 500 | 3.0 | |
| No. 17 | 500 | 2.0 | |
| No. 18 | 500 | 2.3 | |
| No. 19 | 500 | 2.5 | |
| No. 20 | 500 | 2.5 | |
| No. 21 | 500 | 3.0 | |
| No. 22 | 500 | 2.5 | |
| Phenylmercuric acetate (commercial product, comparison) | 20 | 1.5 | |
| Non-treatment | | 5.0 | |

[1] The numbers of compound in the table are the same as those of the aforementioned table (I).
[2] The rate of attack in the table shows average value of 5 plots.

TABLE III.—CONCENTRATION OF PLANT PATHOGEN GROWTH INHIBITION (AGAR DILUTION METHOD)

| Compound [1] | Piricularia oryzae, p.p.m.[2] | Cochliobolue miyabeanus, p.p.m.[2] | Hypochnus sasakii, p.p.m.[2] | Alternaria kikuchiana (pear), p.p.m.[2] | Mycosphaerella melonis (cucumber), p.p.m.[2] | Fusarium oxysporium, p.p.m.[2] |
|---|---|---|---|---|---|---|
| No. 1 | 50 | 200 | 100 | 200 | 100 | 100 |
| No. 2 | 100 | 200 | 200 | 200 | 100 | 100 |
| No. 3 | 50 | 200 | 100 | 200 | 100 | 100 |
| No. 4 | 100 | 500 | 200 | 200 | 100 | 100 |
| No. 5 | 100 | 500 | 200 | 200 | 100 | 100 |
| No. 6 | 100 | 500 | 200 | 200 | 100 | 100 |
| No. 7 | 200 | 200 | >200 | >200 | 100 | >100 |
| No. 8 | 50 | 200 | 100 | 200 | 100 | 100 |
| No. 9 | 200 | 500 | >200 | >200 | 100 | >100 |
| No. 10 | 200 | 500 | >200 | >200 | 100 | >100 |
| Zineb (standard) | 200 | 500 | >200 | >200 | 100 | >100 |
| No. 11 | 50 | >100 | 100 | >100 | 100 | 100 |
| No. 12 | 50 | >100 | 100 | >100 | 100 | 100 |
| No. 13 | 100 | >100 | >100 | >100 | 500 | 500 |
| No. 14 | 100 | >100 | >100 | >100 | 500 | 500 |
| No. 15 | 50 | 100 | >100 | 100 | 100 | 100 |
| No. 16 | 100 | >100 | >100 | 100 | 100 | 100 |
| No. 17 | 50 | >100 | 100 | >100 | 100 | 100 |
| No. 18 | 50 | 100 | 100 | 100 | 100 | 100 |
| No. 19 | 100 | >100 | >100 | >100 | 500 | 500 |
| No. 20 | 100 | >100 | >100 | >100 | 500 | 500 |
| No. 21 | 100 | >100 | >100 | >100 | 500 | 500 |
| No. 22 | 50 | 100 | >100 | 100 | 100 | 100 |
| Zineb (standard) | >100 | >100 | >100 | >100 | 500 | 500 |

[1] Compound numbers are the same with those shown in the aforementioned table (I).
[2] P.p.m. shows minimum growth inhibition concentration.

What is claimed is:
1. A compound selected from the group consisting of O-alkyl S-phenyl benzylphosphonothiolates represented by the following Formula I:

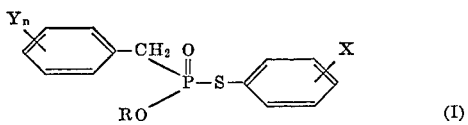

wherein R stands for a member selected from the group consisting of alkyl groups having 1–4 carbon atoms, X stands for a member selected from the group consisting of hydrogen atom, chlorine atom and methyl group, Y stands for a member selected from the group consisting of hydrogen atom, chlorine atom, alkyl groups having 1–4 carbon atoms and alkoxy groups having 1–4 carbon atoms, and $n$ is a number selected from the group consisting of zero, 1 and 2.

2. The compound of claim 1, wherein R stands for a member selected from the group consisting of alkyl groups having 1–3 carbon atoms, X stands for a member selected from the group consisting of hydrogen atom and methyl group, Y stands for chlorine atom and $n$ is a member selected from the group consisting of zero, 1 and 2.

3. The compound of claim 1, wherein said compound is O-methyl S-phenyl benzylphosphonothiolate.

4. The compound of claim 1, wherein said compound is O-methyl S-(4-methylphenyl)benzylphosphonothiolate.

5. The compound of claim 1, wherein said compound is O-ethyl S-phenyl, benzylphosphonothiolate.

6. The compound of claim 1, wherein said compound is O-ethyl S-(4-methylphenyl)benzylphosphonothiolate.

7. The compound of claim 1, wherein said compound is O-iso-propyl S-phenyl benzylphosphonothiolate.

8. The compound of claim 1, wherein said compound is O-methyl S-phenyl 4'-chlorobenzylphosphonothiolate.

9. The compound of claim 1, wherein said compound is O-methyl S-(4-methylphenyl) 4'-chlorobenzylphosphonothiolate.

10. The compound of claim 1, wherein said compound is O-ethyl S-phenyl 4'-chlorobenzylphosphonothiolate.

11. The compound of claim 1, wherein said compound is O-methyl S-(4-methylphenyl) 2',4'-dichlorobenzylphosphonothiolate.

12. The compound of claim 1, wherein said compound is O-ethyl S-phenyl 2',4'-dichlorobenzylphosphonothiolate.

13. The compound of claim 1, wherein said compound is O-methyl S-(4-chlorophenyl)benzylphosphonothiolate.

14. The compound of claim 1, wherein said compound is O-ethyl S-(4-chlorophenyl)benzylphosphonothiolate.

15. The compound of claim 1, wherein said compound is O-methyl S-(4-chlorophenyl) 4'-chlorobenzylphosphonothiolate.

16. The compound of claim 1, wherein said compound is O-ethyl S-(4-chlorophenyl) 4'-chlorobenzylphosphonothiolate.

17. The compound of claim 1, wherein said compound is O-methyl S-(4-chlorophenyl) 2',4'-dichlorobenzylphosphonothiolate.

18. The compound of claim 1, wherein said compound is O-methyl S-(4-chlorophenyl) 3',4'-dichlorobenzylphosphonothiolate.

19. The compound of claim 1, wherein said compound is O-methyl S-phenyl 4'-methylbenzylphosphonothiolate.

20. The compound of claim 1, wherein said compound is O-methyl S-(4-chlorophenyl) 4'-methylbenzylphosphonothiolate.

21. The compound of claim 1, wherein said compound is O-methyl S-(4-methylphenyl) 4'-methylbenzylphosphonothiolate.

22. The compound of claim 1, wherein said compound is O-ethyl S-phenyl 4'-methylbenzylphosphonothiolate.

23. The compound of claim 1, wherein said compound is O-methyl S-phenyl 4'-ethylbenzylphosphonothiolate.

24. The compound of claim 1, wherein said compound is O-methyl S-phenyl 4'-methoxybenzylphosphonothiolate.

References Cited

UNITED STATES PATENTS 3,149,143  9/1964  Newallis et al. _____ 260—961
3,472,932  10/1969  Shindo et al. _____ 260—961X CHARLES B. PARKER, Primary Examiner
A. H. SUTTO, Assistant Examiner U.S. Cl. X.R.

260—543, 960, 961, 973; 424—217, 222